(12) United States Patent
Peng et al.

(10) Patent No.: US 9,047,064 B2
(45) Date of Patent: Jun. 2, 2015

(54) DATA STORAGE DEVICE ASSEMBLY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wen-Tang Peng, New Taipei (TW); Hai-Chen Zhou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 13/935,528

(22) Filed: Jul. 4, 2013

(65) Prior Publication Data

US 2014/0160665 A1 Jun. 12, 2014

(30) Foreign Application Priority Data

Dec. 7, 2012 (CN) .......................... 2012 1 0521568

(51) Int. Cl.
*H05K 7/20* (2006.01)
*G06F 1/18* (2006.01)

(52) U.S. Cl.
CPC ..................................... *G06F 1/187* (2013.01)

(58) Field of Classification Search
None
See application file for complete search history.

(56) References Cited

U.S. PATENT DOCUMENTS 6,407,913 B1 * 6/2002 Peachey et al. .......... 361/679.57
2003/0147220 A1 * 8/2003 Fairchild ....................... 361/726

* cited by examiner

*Primary Examiner* — Anthony Q Edwards
(74) *Attorney, Agent, or Firm* — Novak Druce Connolly Bove + Quigg LLP

(57) ABSTRACT

A data storage device assembly includes a chassis. The chassis includes a dividing plate. Two brackets are arranged on the dividing plate, and another two brackets are arranged at a bottom of the dividing plate. Each bracket receives a data storage device. The data storage device assembly includes four data storage devices arranged in the chassis, which can provide large capacity of data storage.

9 Claims, 5 Drawing Sheets

DATA STORAGE DEVICE ASSEMBLY

CROSS-REFERENCE TO RELATED APPLICATION

Relevant subject matter is disclosed in a pending U.S. patent application (application Ser. No. 13/546,198) filed on Jul. 11, 2012 and entitled "FASTENING DEVICE FOR HARD DISK DRIVE", which is assigned to the same assignee with this patent application.

BACKGROUND

1. Technical Field

The present disclosure relates to a data storage device assembly.

2. Description of Related Art

An electronic device, such as a server, includes a plurality of hard desk drives (HDDs) to provide capacity of data storage device. However, the traditional arrangement for the HDDs cannot provide increasing data storage capacity.

BRIEF DESCRIPTION OF THE DRAWINGS

Many aspects of the present embodiments can be better understood with reference to the drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
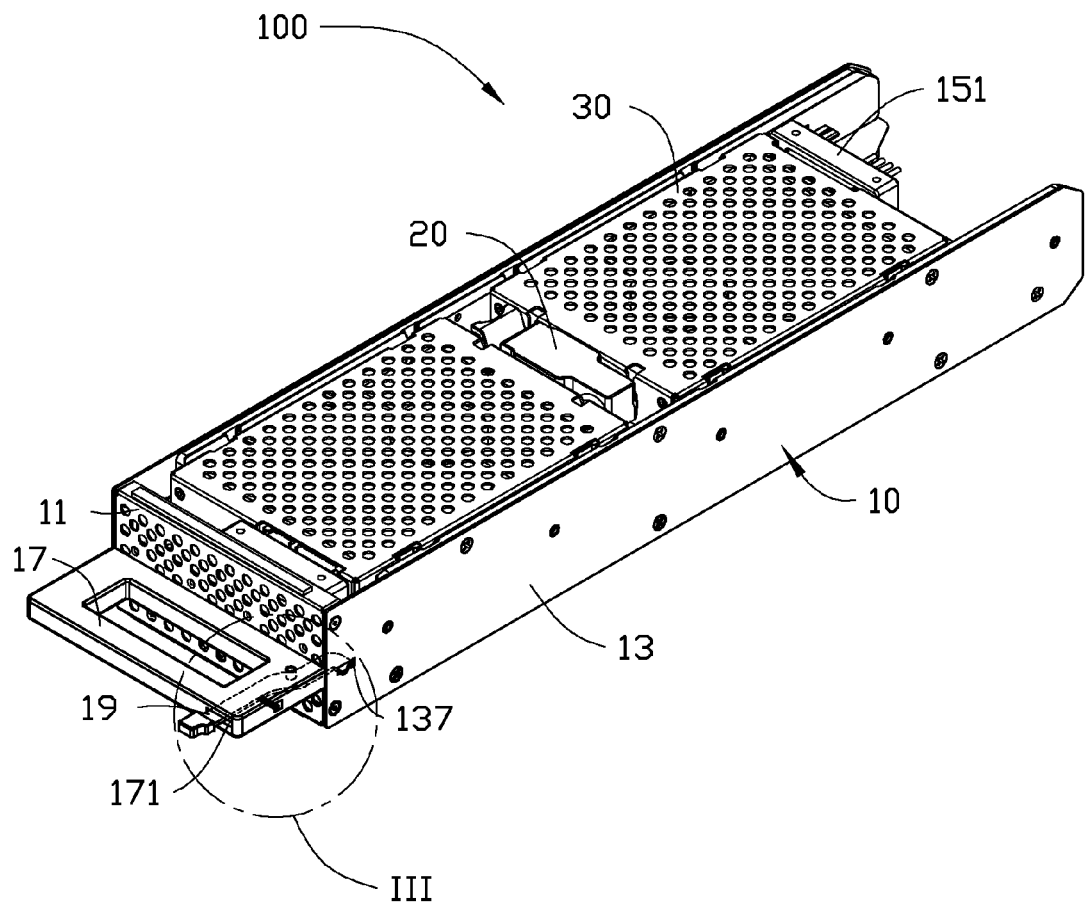
FIG. 1 is an assembled, isometric view of an embodiment of a data storage device assembly.
Figure 2:
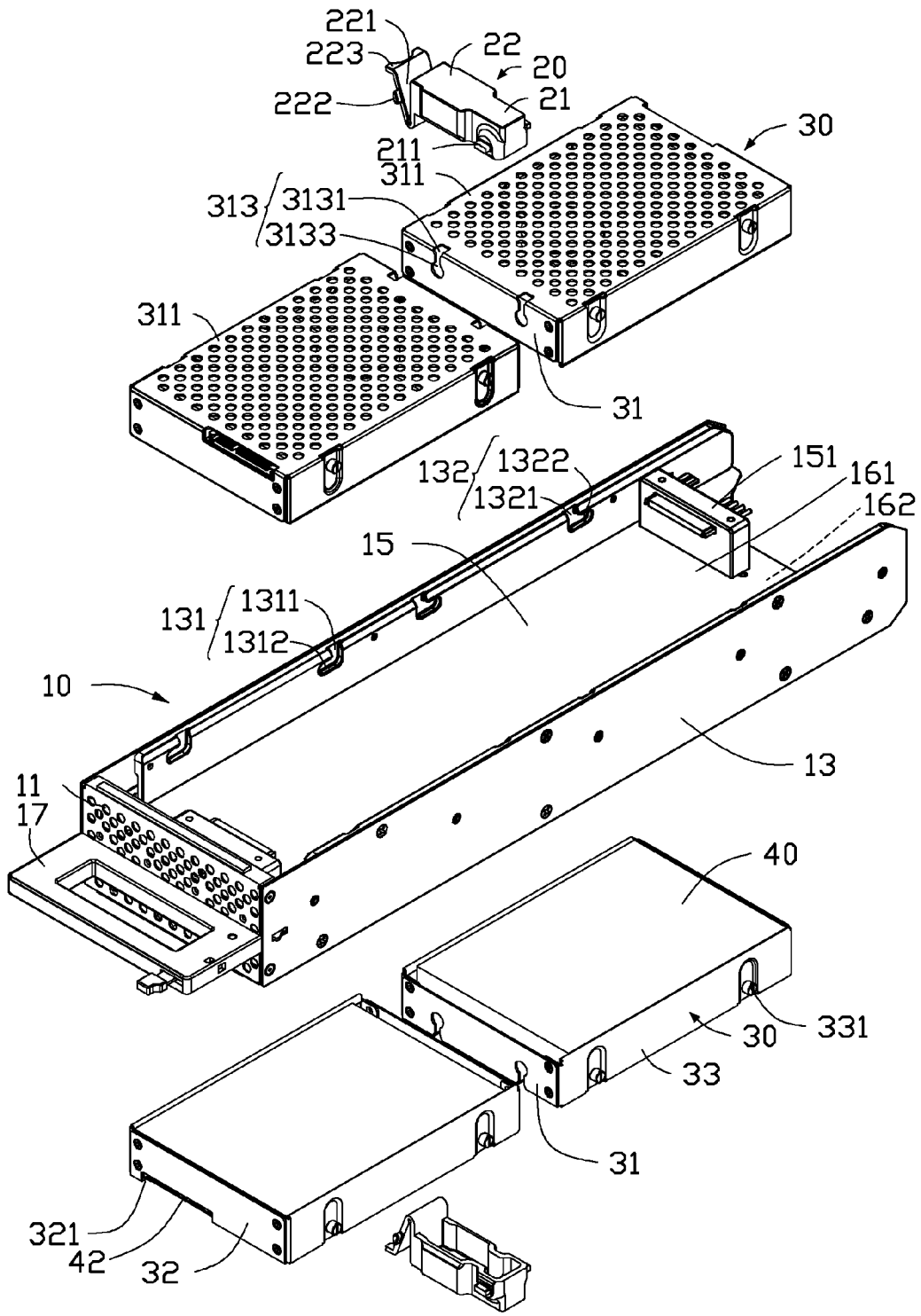
FIG. 2 is an exploded, isometric view of FIG. 1.

Referring to FIG. 1 and FIG. 2, an embodiment of a data storage device assembly 100 includes a chassis 10, two mounting members 20, four brackets 30, and four data storage devices 40 received in the brackets 30. In this embodiment, the data storage devices 40 are hard disk drives.

The chassis 10 includes an end wall 11, two sidewalls 13 extending rearward from opposite ends of the end wall 11, a dividing plate 15 connected substantially perpendicularly among middles of the sidewalls 13 and the end wall 11, and a ring shaped handle 17 formed from a front surface of the end wall 11 opposite to the sidewalls 13. The dividing plate 15 and the sidewalls 13 together form an upper receiving space 161 and a lower receiving space 162 respectively above and below the dividing plate 15, each receiving space 161, 162 for receiving two brackets 30.

The brackets 30 located above the dividing plate 15 shown in FIG. 2 are described as an example.

Two connectors 151 are set on front and rear ends of a top surface of the dividing plate 15, and substantially located at a diagonal of the dividing plate 15. Two L-shaped first locking slots 131 are defined in an inner surface of each sidewall 13 adjacent to the end wall 11. Each first locking slot 131 includes an upright inlet portion 1311 extending through a top surface of the sidewall 13, and a horizontal locating portion 1312 extending forward from a bottom end of the inlet portion 1311 toward the end wall 11. Two L-shaped second locking slots 132 are defined in the inner surface of each sidewall 13 away from the end wall 11. Each second locking slot 131 includes an upright inlet portion 1321 extending through the top surface of the sidewall 13, and a horizontal locating portion 1322 extending from a bottom end of the inlet portion 1321 away from the end wall 11.

Figure 3:
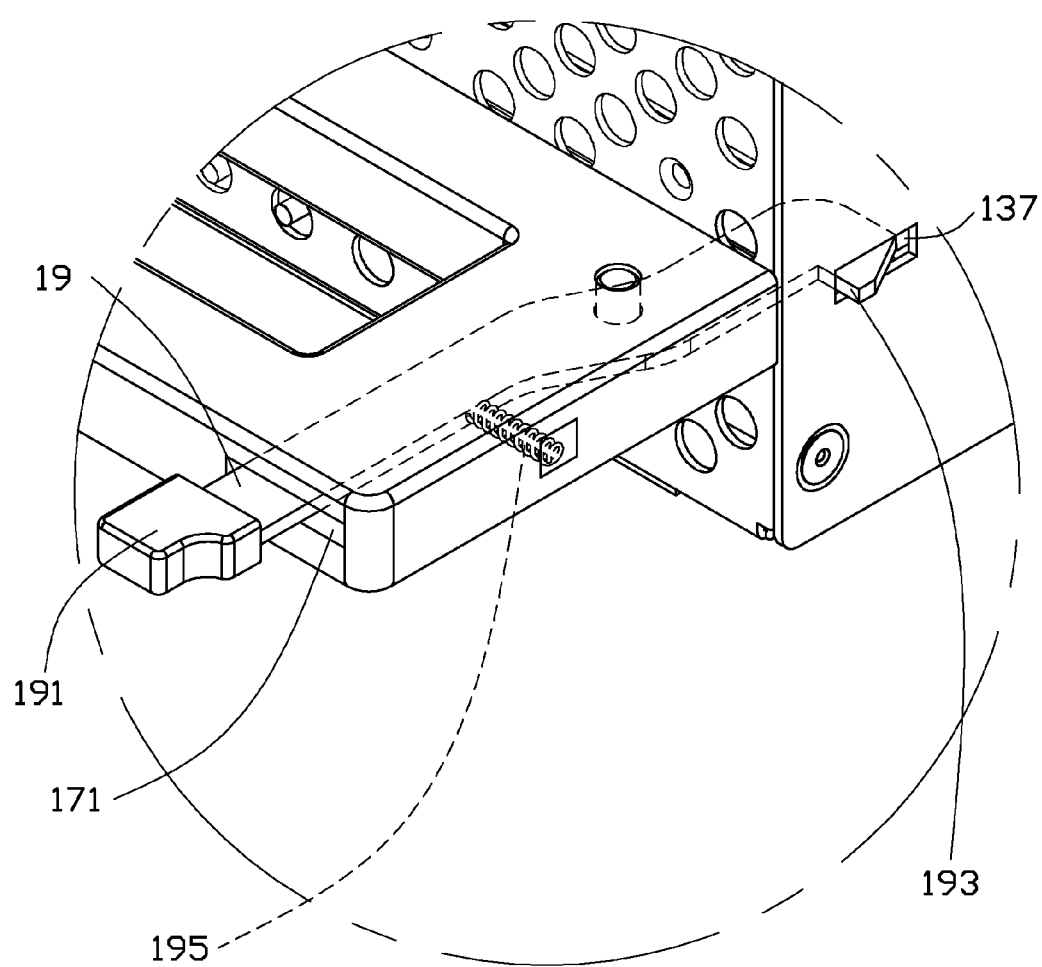
FIG. 3 is an enlarged view of a circled portion III of FIG. 1.

Referring to FIG. 3, a through slot 171 is defined in a first side of the handle 17 and extends through a front surface of the handle 17 and the end wall 11. A locking hole 137 is defined in one of the sidewalls 13, adjacent to the first side of the handle 17, and communicating with the through slot 171. A latch 19 is received in the through slot 171. A middle of the latch 19 is pivotably mounted to the handle 17. The latch 19 includes an operation portion 191 formed at a front end of the latch 19 and exposed out of the handle 17, and a hook 193 formed at a rear end of the latch 19 and extending through the locking hole 137. A resilient member 195, such as a compression spring, is arranged between a portion of the latch 19 adjacent to the operation portion 191 and the handle 17.

The mounting member 20 includes a first end 21, and a second end 22 greater than the first end 21 in width. Two compressed first tabs 211 extend from opposite sides of the first end 21. A V-shaped resilient piece 221 extends from the second end 22. Two second tabs 222 extend from opposite sides of a cantilevered portion of the resilient piece 221. An operation piece 223 is formed at a distal end of the cantilevered portion of the resilient piece 221.

Each bracket 30 is box-shaped, and includes a base plate 311, a first end plate 31 extending substantially perpendicularly from a first end of the base plate 311, a second end plate 32 extending substantially perpendicularly from a second end of the base plate 311, and two side plates 33 extending substantially perpendicularly from opposite sides of the base plate 311 and connected between the first end plate 31 and the second end plate 32. Two slots 313 are defined in the first end plate 31 and extend through the base plate 311. Each slot 313 includes an access portion 3131 extending through the base plate 311 and a receiving portion 3133 communicating with an end of the access portion 3131 opposite to the base plate 311. The second end plate 32 defines a through hole 321 for exposing a socket 42 of the data storage device 40. Two pins 331 extend out from each side plate 33.

Figure 4:
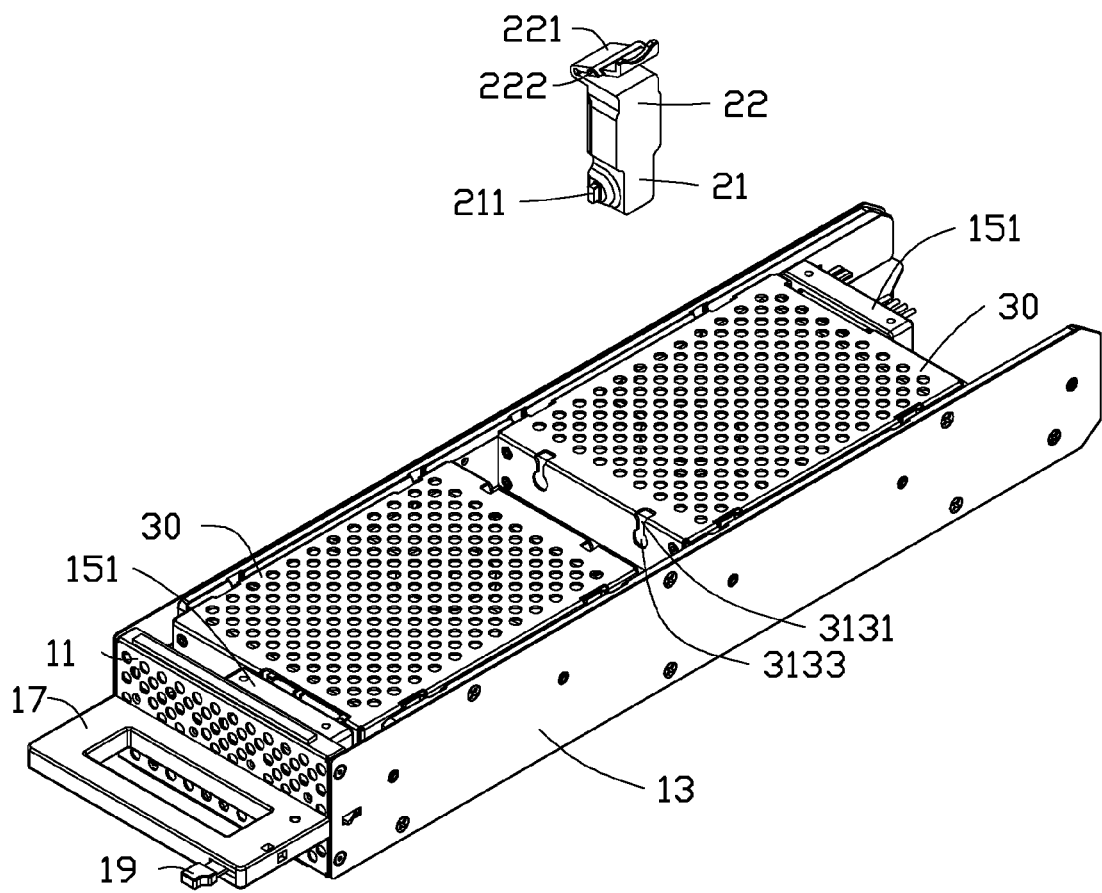
FIG. 4 and FIG. 5 are similar to FIG. 1, but showing two different states of assembly.
Figure 5:
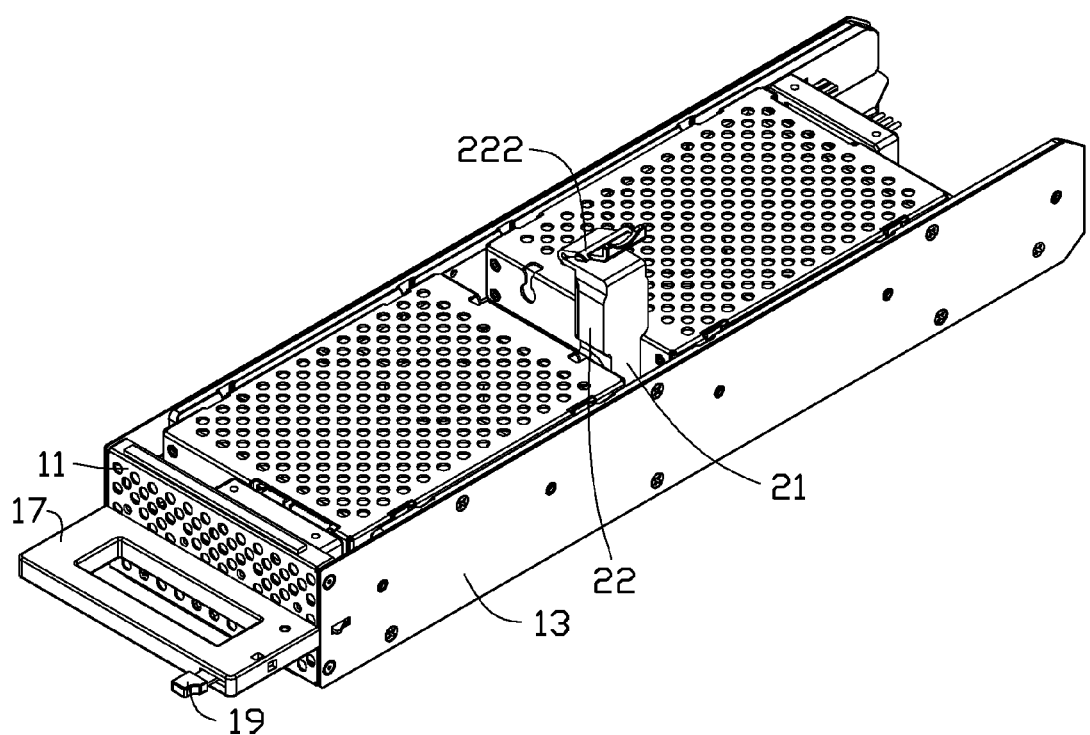

Referring to FIG. 4 and FIG. 5, in assembly, two of the brackets 30 are received in the upper receiving space 161, with the first end plates 31 of the brackets 30 facing each other. The pins 331 of one bracket 30 adjacent to the end wall 11 are inserted in the inlet portions 1311 of the first locking slots 131. The bracket 30 is then pushed toward the end wall 11 until the data storage device 40 is connected to the corresponding connector 151. The pins 331 of the bracket 30 are located in the locating portions 1312. The pins 331 of the bracket 30 away from the end wall 11 are inserted in the inlet portions 1321 of the second locking slots 132. The bracket 30 is then pushed away from the end wall 11 until the data storage device 40 is connected to the corresponding connector 151. The pins 331 of the bracket 30 are located in the locating portions 1322.

The first end 21 of the mounting member 20 is arranged between the brackets 30, with the first tabs 211 uprightly inserting in the receiving portions 3133 of two opposite slots 313 of the two brackets 30 through the corresponding access portions 3131. The mounting member 20 is then rotated toward the dividing plate 15 about the first tabs 211. The second tabs 222 abut against sidewalls bounding the access portions 3131 of another two opposite slots 313 of the two brackets 30. The resilient piece 221 is deformed, until the second tabs 222 engage in the corresponding receiving portions 3133. Thus, the first tabs 211 are retained horizontally in the corresponding receiving portions 3133 to prevent the first end 21 from releasing from the receiving portions 3133. The second end 22 of the mounting member 20 abuts against the first end plates 31 of the brackets 30 to prevent the data storage devices 40 from releasing from the connectors 151.

Using the same process above, the other two of the brackets 30 are mounted to the chassis 10 and received in the lower receiving space 162. Thus the four data storage devices 40 are arranged together in the chassis 10.

When the data storage device assembly 100 is mounted in an enclosure of a server, and the hook 193 extends through the locking hole 137 to latch to the enclosure. When the data storage device assembly 100 is removed from the enclosure, the operation portion 191 is operated to pivot the latch 19 with deforming the resilient member 195. The hook 193 is released from the enclosure. The data storage device assembly 100 can then be removed from the enclosure by pulling the handle 17.

In the embodiment, the data storage device assembly 100 includes four data storage devices 40 arranged in the chassis 10, which can provide a large data storage capacity.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A data storage device assembly, comprising:
a chassis comprising two sidewalls, a dividing plate connected between middles of the sidewalls, and a first connector and a second connector set on front and rear ends of each of top and bottom surfaces of the dividing plate respectively, wherein the dividing plate and the sidewalls together bound an upper and a lower receiving spaces respectively above and below the dividing plate, each of the sidewalls defines two pairs of first locking slots located above and below the dividing plate respectively and adjacent to the first connectors, and two pairs of second locking slots located above and below the dividing plate respectively and adjacent to the second connectors;
four brackets each receiving a data storage device, wherein each of the brackets comprising a first end plate, a second end plate opposite to the first end plate, and two side plates connected between the first end plate and the second end plate, each side plate forms two pins, the second end plates each define a through hole for exposing a port of the corresponding data storage device, two of the brackets are received in the upper receiving space and the other two of the bracket are received in the lower receiving space with the corresponding first end plates facing each other, the pins of the brackets are engaged in the corresponding first locking slots and the corresponding second locking slots respectively, the data storage devices are connected to the first and second connectors respectively; and
two mounting members respectively sandwiched between the first end plates of the two of the brackets located above and below the dividing plate.

2. The data storage device assembly of claim 1, wherein each of the mounting members comprises a first end, a second end, two first tabs extending from opposite sides of the first end, a resilient piece extending from the second end, and two second tabs extending from opposite ends of the resilient piece, the first end plates of the brackets each define a first slot and a second slot, the first tabs engage in the first slots of the first end plates, and the second tabs engage in the second slots of the first end plates.

3. The data storage device assembly of claim 2, wherein the second end of each mounting member is greater than the first end in width, the first tabs are compressed, each of the first slots and the second slots comprises an access portion and a receiving portion communicating with the access portion, the first end is arranged between the brackets, with the first tabs inserting uprightly in the receiving portions of the first slots through the corresponding access portions, the mounting member is then rotated toward the dividing plate, the second tabs abut against sidewalls bounding the second slots, the resilient piece is deformed until the second tabs engage in the corresponding receiving portions of the second slots through the corresponding access portions, the first tabs are retained horizontally in the corresponding receiving portions of the first slots, the second end abuts against the first end plates of the brackets, for preventing the data storage devices from releasing from the first and second connectors.

4. The data storage device assembly of claim 2, wherein the resilient piece is V-shaped.

5. The data storage device assembly of claim 4, wherein an operation piece is formed at a distal end of the resilient piece for facilitating operating the corresponding mounting member.

6. The data storage device assembly of claim 1, wherein each of the first locking slots is substantially L-shaped and comprises an upright first inlet portion extending through a top surface of the sidewall, and a horizontal first locating portion extending from a bottom end of the first inlet portion toward the first connector, each of the second locking slots is substantially L-shaped and comprises an upright second inlet portion extending through the top surface of the sidewall, and a horizontal second locating portion extending from a bottom end of the second inlet portion toward the second connector.

7. The data storage device assembly of claim 6, wherein an end wall is connected between ends of the sidewalls, the first connectors are adjacent to the end wall, and the second connectors are away from the end wall.

8. The data storage device assembly of claim 7, wherein the end wall forms a handle opposite to the sidewalls, the handle defines a through slot in a first side of the handle and extending through a front surface of the handle and the end wall, one of the sidewalls defines a locking hole adjacent to the first side of the handle, and communicates with the through slot, the through slot receives a latch, a middle of the latch is pivotably mounted to the handle, and the latch comprises an operation portion and a hook formed at opposite ends of the latch, the operation portion is exposed out of the handle, and the hook extends through the locking hole.

9. The data storage device assembly of claim 8, further comprising a resilient member arranged between a portion of the latch adjacent to the operation portion and the handle.

* * * * *